(12) United States Patent
Williams

(10) Patent No.: US 11,648,688 B2
(45) Date of Patent: May 16, 2023

(54) MODULAR ARTICULATING GRIPPER

(71) Applicant: PHD, Inc., Fort Wayne, IN (US)

(72) Inventor: Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 17/681,082

(22) Filed: Feb. 25, 2022

(65) Prior Publication Data

US 2022/0176570 A1 Jun. 9, 2022

Related U.S. Application Data

(63) Continuation of application No. 17/094,957, filed on Nov. 11, 2020, now Pat. No. 11,285,617.

(60) Provisional application No. 62/955,634, filed on Dec. 31, 2019.

(51) Int. Cl.
*B25J 15/00* (2006.01)
*B25J 9/10* (2006.01)

(52) U.S. Cl.
CPC .................... *B25J 15/0009* (2013.01)

(58) Field of Classification Search
CPC .... B25J 15/0009; B25J 15/0004; B25J 15/08; B25J 15/083; B25J 9/08; B25J 9/144; B25J 9/1075
USPC ................................. 294/106, 213
See application file for complete search history.

(56) References Cited

U.S. PATENT DOCUMENTS

| | | | |
|---|---|---|---|
| 2,545,452 A | 3/1951 | Fletcher | |
| 3,694,021 A | 9/1972 | Mullen | |
| 4,185,866 A | 1/1980 | Wittwer | |
| 4,452,479 A | 6/1984 | Terai et al. | |
| 4,558,911 A | 12/1985 | Ruoff | |
| 4,685,924 A | 8/1987 | Massey | |
| 5,200,679 A | 4/1993 | Graham | |

(Continued)

FOREIGN PATENT DOCUMENTS

| JP | 2011-121162 A | 6/2011 |
|---|---|---|
| WO | 2017/116614 A2 | 7/2017 |

OTHER PUBLICATIONS

Che et al.; "Active Gesture-Changeable Underactuacted Finger for Humanoid Robot Hand Based on Multiple Tendons"; presented at the IFToMM/ASME International Workshop on Underactuated Grasping (UG2010); Aug. 19, 2010; Montreal, Canada.

(Continued)

*Primary Examiner* — Paul T Chin
(74) *Attorney, Agent, or Firm* — Taylor IP, P.C.

(57) ABSTRACT

A gripper for gripping a workpiece includes: a base; at least one middle segment pivotally connected to the base; a distal segment pivotally connected to the at least one middle segment; at least one actuator disposed within the base; an adducting tendon having a proximal end attached to the at least one actuator and a distal end attached to the distal segment, the at least one actuator being configured for linearly and nonrotationally moving the proximal end of the adducting tendon; and an abducting tendon having a proximal end attached to the base and a distal end attached to the distal segment, wherein the middle segment and the distal segment are configured for gripping the workpiece as the at least one actuator moves in a first direction and ungripping the workpiece as the at least one actuator moves in a second direction which is opposite to the first direction.

16 Claims, 10 Drawing Sheets

(56) References Cited

U.S. PATENT DOCUMENTS

| | | | |
|---|---|---|---|
| 5,447,403 A * | 9/1995 | Engler, Jr. | B25J 15/0009 |
| | | | 294/111 |
| 6,244,644 B1 | 6/2001 | Lovchik et al. | |
| 6,505,870 B1 | 1/2003 | Laliberté et al. | |
| 6,874,834 B2 | 4/2005 | McIntosh et al. | |
| 8,424,942 B2 | 4/2013 | Park et al. | |
| 8,757,690 B2 | 6/2014 | Gao et al. | |
| 8,936,289 B1 | 1/2015 | Kozlowski et al. | |
| 8,973,958 B2 | 3/2015 | Demers et al. | |
| 9,545,727 B1 | 1/2017 | Shamlian et al. | |
| 9,914,214 B1 | 3/2018 | Strauss et al. | |
| 10,046,461 B2 | 8/2018 | Ekas | |
| 10,384,343 B2 | 8/2019 | Riviere et al. | |
| 2005/0121929 A1 * | 6/2005 | Greenhill | B25J 9/1075 |
| | | | 294/106 |
| 2014/0097631 A1 | 4/2014 | Ciocarlie et al. | |
| 2018/0050456 A1 | 2/2018 | Yamanaka | |
| 2019/0375114 A1 | 12/2019 | Williams | |
| 2020/0164523 A1 | 5/2020 | Hallock et al. | |
| 2020/0206949 A1 | 7/2020 | Liu et al. | |
| 2021/0138635 A1 | 5/2021 | Elder et al. | |
| 2021/0197403 A1 | 7/2021 | Kim et al. | |

OTHER PUBLICATIONS

Wang et al.; "A Highly-Underactuated Robotic Hand with Force and Joint Angle Sensors"; 2011 IEEE/RSJ International Conference on Intelligent Robots and Systems; Sep. 25-30, 2011; San Francisco, CA, USA.

Extended European Search Report dated Jun. 9, 2021 for European Patent Application No. 20214978.7 (10 pages).

* cited by examiner

MODULAR ARTICULATING GRIPPER

CROSS REFERENCE TO RELATED APPLICATIONS

This is a continuation of U.S. patent application Ser. No. 17/094,957, entitled "MODULAR ARTICULATING GRIPPER", filed Nov. 11, 2020, which is incorporated herein by reference. U.S. patent application Ser. No. 17/094,957 is a non-provisional application based upon U.S. provisional patent application Ser. No. 62/955,634, entitled "MODULAR ARTICULATING GRIPPER", filed Dec. 31, 2019, which is incorporated herein by reference.

BACKGROUND OF THE DISCLOSURE

1. Field of the Invention

The present invention relates to gripper tooling, and, more particularly, to self-articulating grippers.

2. Description of the Related Art

The present invention incorporates some elements of the autonomously encapsulating gripper tooling previously disclosed in U.S. patent application Ser. No. 16/430,724, entitled "AUTONOMOUSLY ENCAPSULATING GRIPPER TOOLING", filed Jun. 4, 2019, which claims benefit to U.S. provisional patent application Ser. No. 62/682,471, filed Jun. 8, 2018.

Grippers are mechanical devices which generally include jaws that are moved together or apart by motive devices, such as electric motors or pneumatic pistons. Tooling is typically fastened to the jaw to provide some degree of conformal contact between the surface of the tool and one or more surfaces of a gripped workpiece. Once the jaws have moved the fastened tooling into a position of contact with the gripped workpiece, the jaws produce a force against the tooling which is transferred by the tooling to retain the workpiece so that the position of the workpiece might be subsequently translated or rotated. It is often desirable that the tooling fully or partially encapsulate the profile of the workpiece to prevent relative motion from occurring between the workpiece and tooling as the workpiece is subsequently translated or rotated or external forces are applied to the workpiece.

It is known in the art to construct the tooling with a complimentary contacting surface profile which corresponds to the profile of the workpiece to better encapsulate a gripped workpiece. This method of encapsulation typically renders the tooling suitable for only gripping a single shape of workpiece or a series of similarly shaped workpieces that share a common surface profile. Generally, tooling must be removed and replaced if a noncompatible shape of workpiece is to be subsequently gripped, resulting in an undesirable increase in downtime and reduced throughput for the manufacturing or material handing operation of which the gripper is a part.

What is needed in the art is a cost-effective gripper for automatically accommodating the shape of the workpiece and gripping the workpiece.

SUMMARY OF THE INVENTION

The autonomously encapsulating gripper tooling disclosed in U.S. provisional patent application Ser. No. 62/682,471 derives the motive force to articulate the tooling from the gripper to which the tooling in mounted. In contrast, the embodiments presented in this disclosure contain internal fluid powered actuators which directly supply the motive force for articulation, independently of any external gripper. Although the present disclosure is directed to the use of pneumatic actuators, it will be apparent to one skilled in the art that an electric motor or linear actuator could be substituted for the pneumatic actuators without substantively changing the embodiment.

The present invention provides a modular gripper capable of autonomously adjusting to conform to the gripped profile of the workpiece, so as to encapsulate a broad spectrum of shapes and sizes of workpieces. The modular gripper comprises a single, articulating finger which is actuated by the application of fluid pressure to one or more internal fluid cylinders. A plurality of modular grippers can be arrayed together to increase the total gripping force applied to a gripped workpiece and/or the locations at which the gripping force is applied.

The invention in one form is directed to a gripper for gripping a workpiece. The gripper including a base, at least one middle segment pivotally connected to the base, a distal segment pivotally connected to the at least one middle segment, at least one actuator disposed within the base, an adducting tendon having a proximal end attached to the at least one actuator and a distal end attached to the distal segment, and an abducting tendon having a proximal end attached to the base and a distal end attached to the distal segment. The at least one middle segment and the distal segment are configured for gripping the workpiece as the at least one actuator moves in a first direction and ungripping the workpiece as the at least one actuator moves in a second direction which is opposite to the first direction.

The invention in another form is directed to a gripper array for gripping a workpiece. The gripper array including a manifold and a plurality of grippers mounted on the manifold. Each gripper of the plurality of grippers includes a base, at least one middle segment pivotally connected to the base, a distal segment pivotally connected to the at least one middle segment, at least one actuator disposed within the base, an adducting tendon having a proximal end attached to the at least one actuator and a distal end attached to the distal segment, and an abducting tendon having a proximal end attached to the base and a distal end attached to the distal segment. The at least one middle segment and the distal segment of each gripper of the plurality of grippers are configured for gripping the workpiece as the at least one actuator moves in a first direction and ungripping the workpiece as the at least one actuator moves in a second direction which is opposite to the first direction.

The invention in yet another form is directed to a method for gripping a workpiece. The method includes an initial step of providing a gripper. The gripper includes a base, at least one middle segment pivotally connected to the base, a distal segment pivotally connected to the at least one middle segment, at least one actuator disposed within the base, an adducting tendon having a proximal end attached to the at least one actuator and a distal end attached to the distal segment, and an abducting tendon having a proximal end attached to the base and a distal end attached to the distal segment. The method further includes a step of gripping the workpiece, by the at least one middle segment and the distal segment, upon moving the at least one actuator in a first direction. The method further includes a step of ungripping the workpiece, by the at least one middle segment and the distal segment, upon moving the at least one actuator in a second direction which is opposite to the first direction.

An advantage of the present invention is that the gripper finger articulates, via the action of the internal fluid powered cylinder, to encapsulate a plethora of differently-shaped workpieces.

Another advantage of the present invention is that a plurality of grippers can be easily arrayed together to increase the total gripping force applied to a gripped workpiece and/or the locations at which the gripping force is applied.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
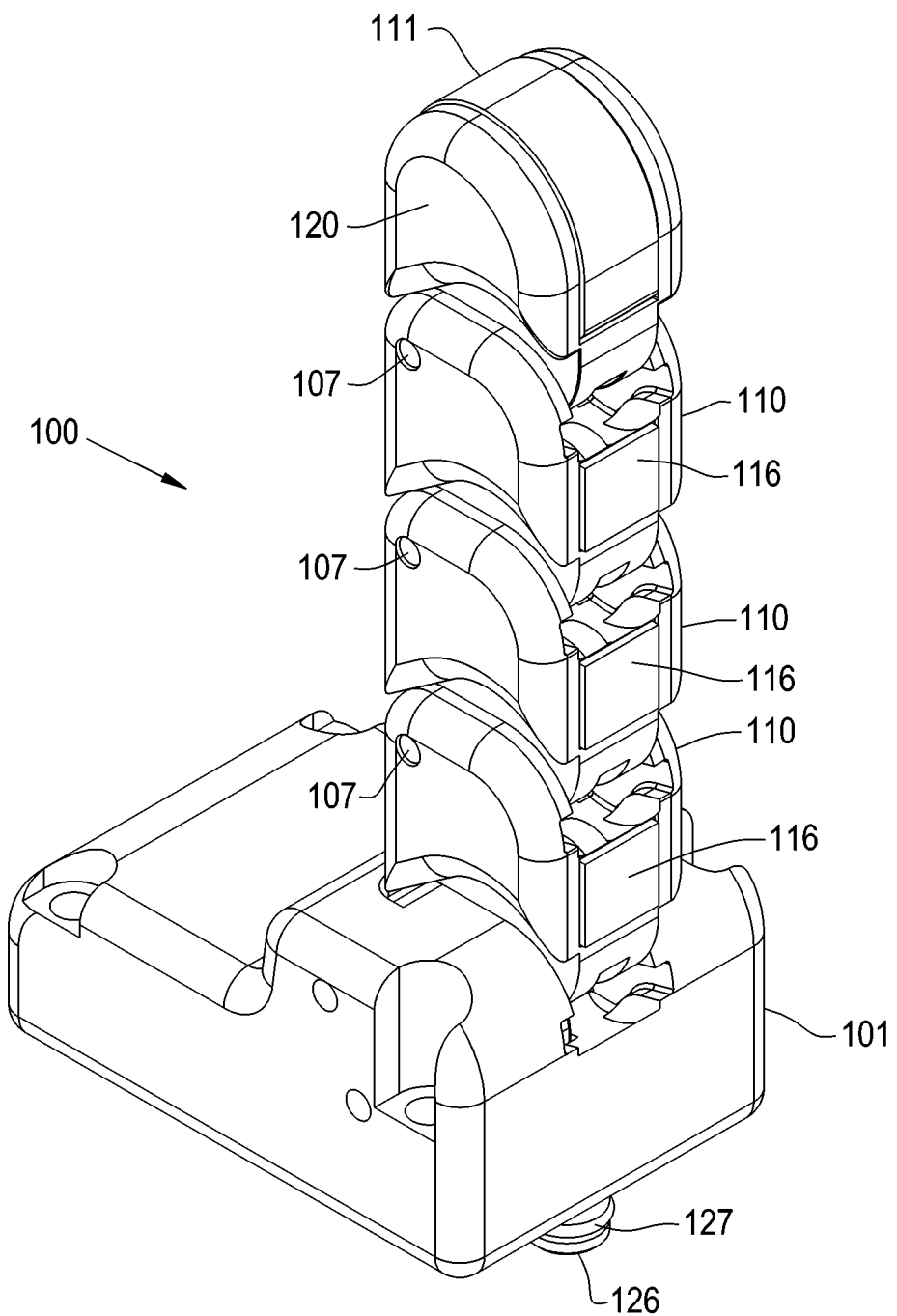
FIG. 1 is a perspective view of an embodiment of a gripper, which includes cylinders and slidable pistons orientated orthogonal to the longitudinal axis of the finger segments.

Referring now to the drawings, and more particularly to FIGS. 1-5, there is shown an embodiment of the gripper 100 consisting of base 101 to which is attached a chain of multiple identical articulated segments 110, capped by an articulated distal segment 120. Gripper 100 may include an adducting tendon 102 having a proximal end connected to yoke 103 within the base 101 and a distal end connected to the distal segment 120. The adducting tendon 102 may be in the form of a cable 102. A setscrew 104 may mechanically fasten the proximal end of the cable 102 to the yoke 103. However, in addition or alternatively to such mechanical attachment, the cable 102 may be attached with a suitable adhesive applied between the cable 102 and the yoke 103. The cable 102 may be composed of any desired material. In one embodiment, the cable 102 is a polymer cable which offers the advantages over a traditional steel cable of improved resistance to fatigue and corrosion, greater flexibility, improved dissipation of mechanical shock, and lower cost.

A pulley 105, supported by pivot pin 106 pressed into complimentary holes in base 101, routes the motion of cable 102 so that as the proximal end of the cable 102 is pulled by the motion of yoke 103 relative to base 101, cable 102 is drawn through the central passages of articulated segments 110. Although pulley 105 is shown as being directly supported by pivot pin 106, it is understood that a suitable commercial bearing bushing, radial ball bearing, or needle bearing could be interposed between the pulley and pin when the size of pulley 105 is sufficiently large to allow doing so.

Pivot pins 107 pass though complimentary holes in base 101 and segments 110 and 120 to attach common segments 110 to base 101, to each other, and to distal segment 120, forming a chain of pinned articulated segments radiating outwards from base 101. Although segments 110 and segment 120 are shown as being directly supported by pivot pins 107, it is understood that a suitable commercial bearing bushing, radial ball bearing, or needle bearing could be interposed between the pivot hole in the segments and pin 107 when the size of segment is sufficiently large to allow doing so.

The upper, distal end of the cable 102 may be mechanically fastened to the distal segment 120 with an upper knurled cylindrical cleat 108. It should be appreciated that the cable 102 and the segment 120 may be additionally or alternatively mechanically attached to one another by a suitable adhesive applied between the cable 102 and the segment 120 and/or suitable setscrew configured to reside within segment 120 to apply a clamping force against cable 102. Cable 102 passes over pulleys 109 disposed within each identical segment 110. In this manner, cable 102, suitably attached between yoke 103 and distal segment 120, effectively forms the taut adducting tendon 102 located on one side of segment pivot pins 107. Although pulleys 109 are shown as being directly supported by pivot pins 106 pressed into complimentary holes in segments 110, it is understood that a suitable commercial bearing bushing, radial ball bearing, or needle bearing could be interposed between the pulley and pin when the size of pulley 109 is sufficiently large to allow doing so.

Gripper 100 may include an abducting tendon 111. An external strip 111 may effectively form the abducting tendon 111, which is located on the opposing side of pivot pins 107. The external strip 111 may be composed of a suitable elastomeric material. The distal end of the strip 111 is attached with setscrew 112 or in any desired way, such as thermal or adhesive bonding, into a complimentary groove in distal segment 120. The proximal end of elastomeric strip 111 is disposed within a complementary slot in base 101 and is attached to base 101 by the clamping action of setscrew 113 or by other suitable thermal or adhesive bonding. The portion of strip 111 between the distal and proximal attached ends is unconstrained and free to stretch or relax. The strip 111 is stretched during installation to create a tension in the strip 111 which acts to pull distal segment 120 toward base 101. This pull induces a torque in distal segment 120 and common segments 110 which acts to rotate each segment counterclockwise (CCW) with respect to pivot pins 107. It should be understood by one skilled in the art that strip 111 could be replaced by one or more helical extension springs or a flexible, but non-stretchable tensile member attached to a suitable spring to provide the same function as an elastomeric strip.

Figure 4:
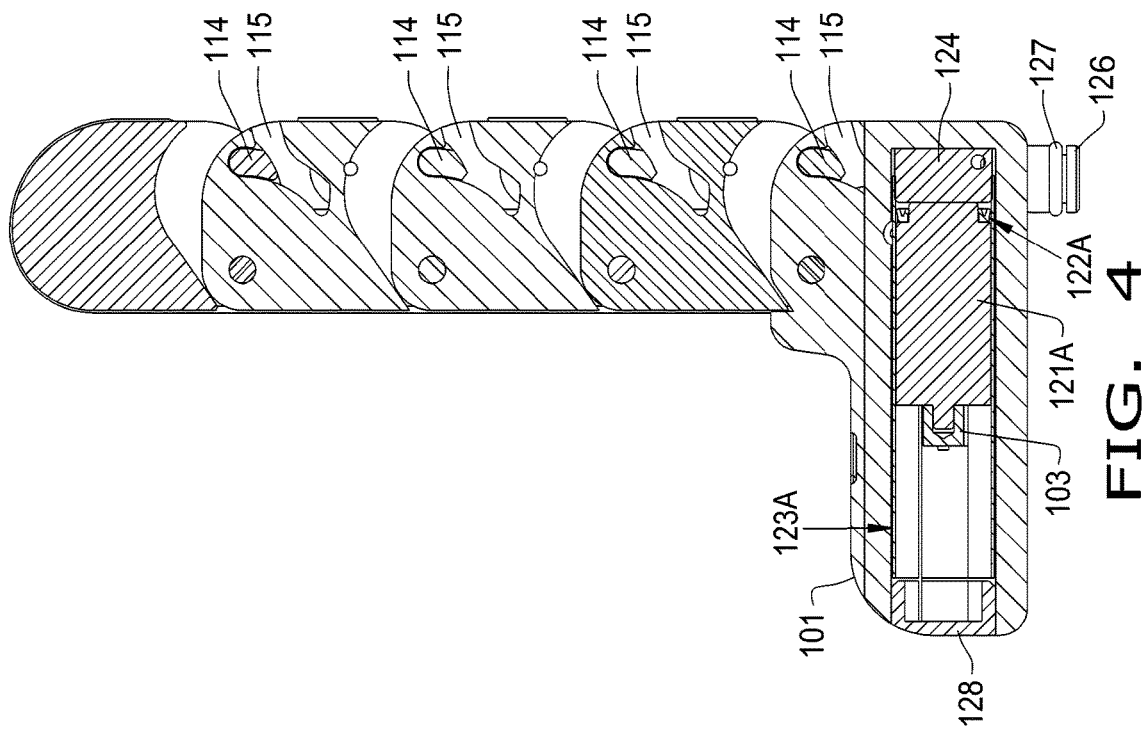
FIG. 4 is a cross-sectional view of the gripper, taken across line 4-4 in FIG. 3.
Figure 6:
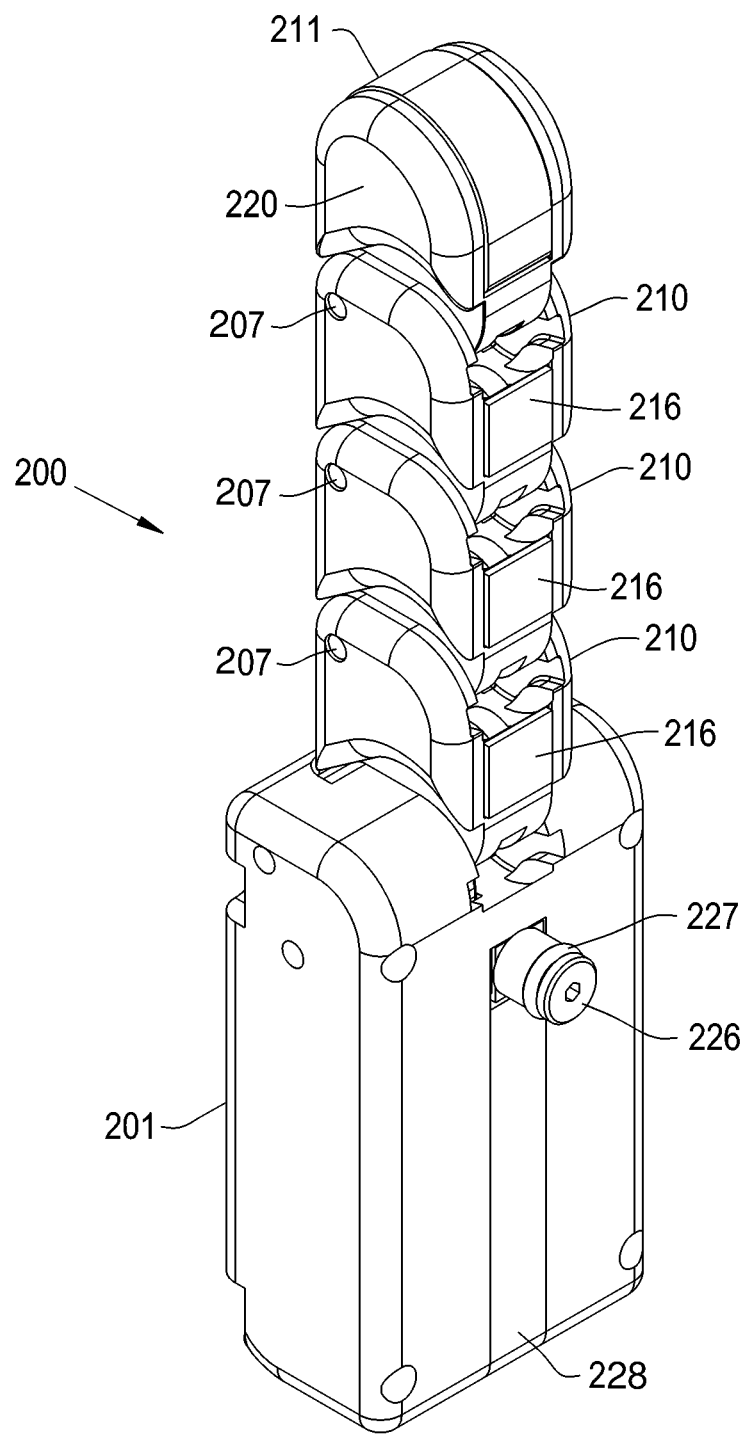
FIG. 6 is a perspective view of another embodiment of a gripper, which includes cylinders and slidable pistons orientated parallel to the longitudinal axis of the finger segments.
Figure 7:
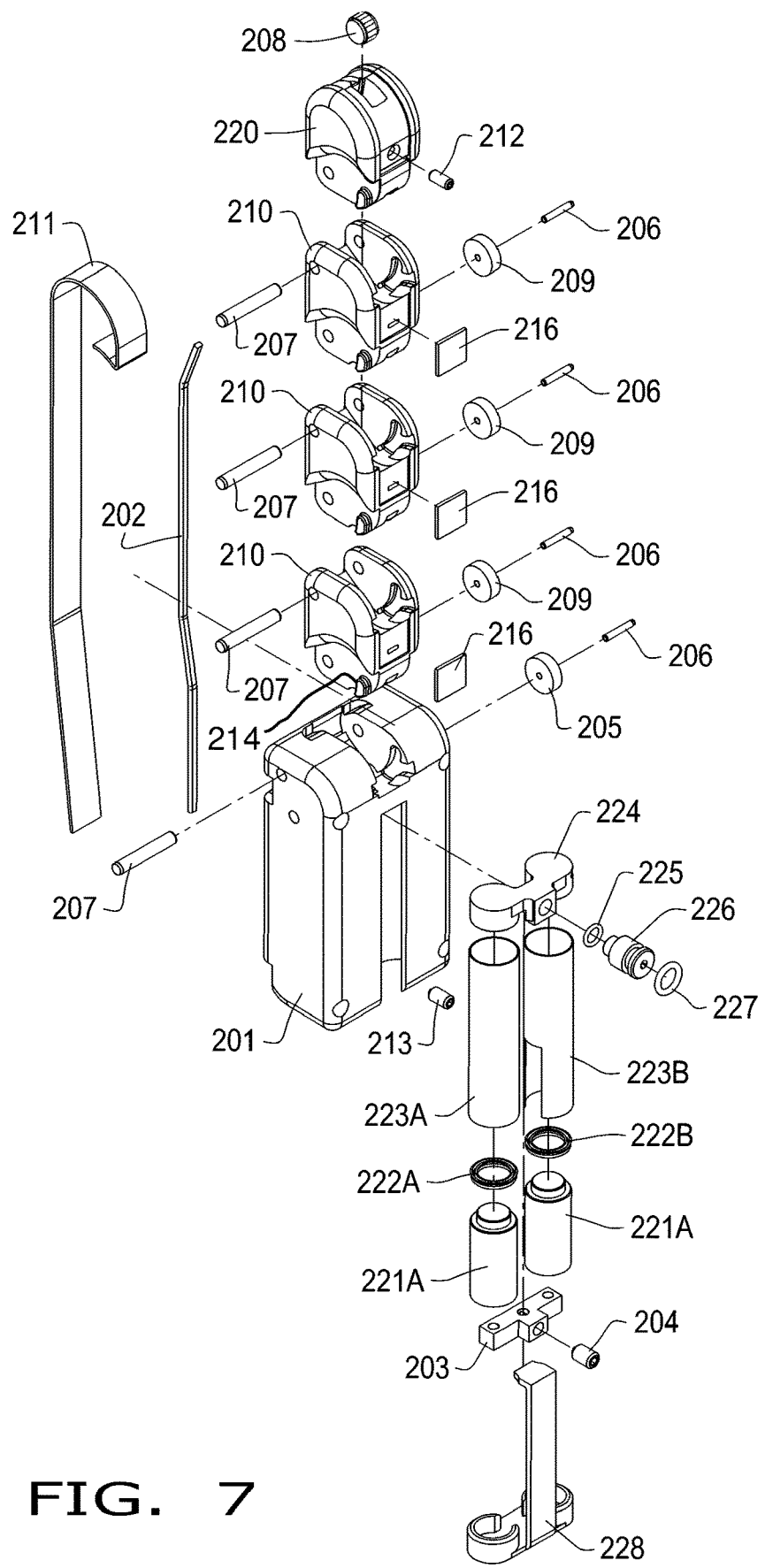
FIG. 7 is an exploded view of the gripper of FIG. 6.
Figure 8:
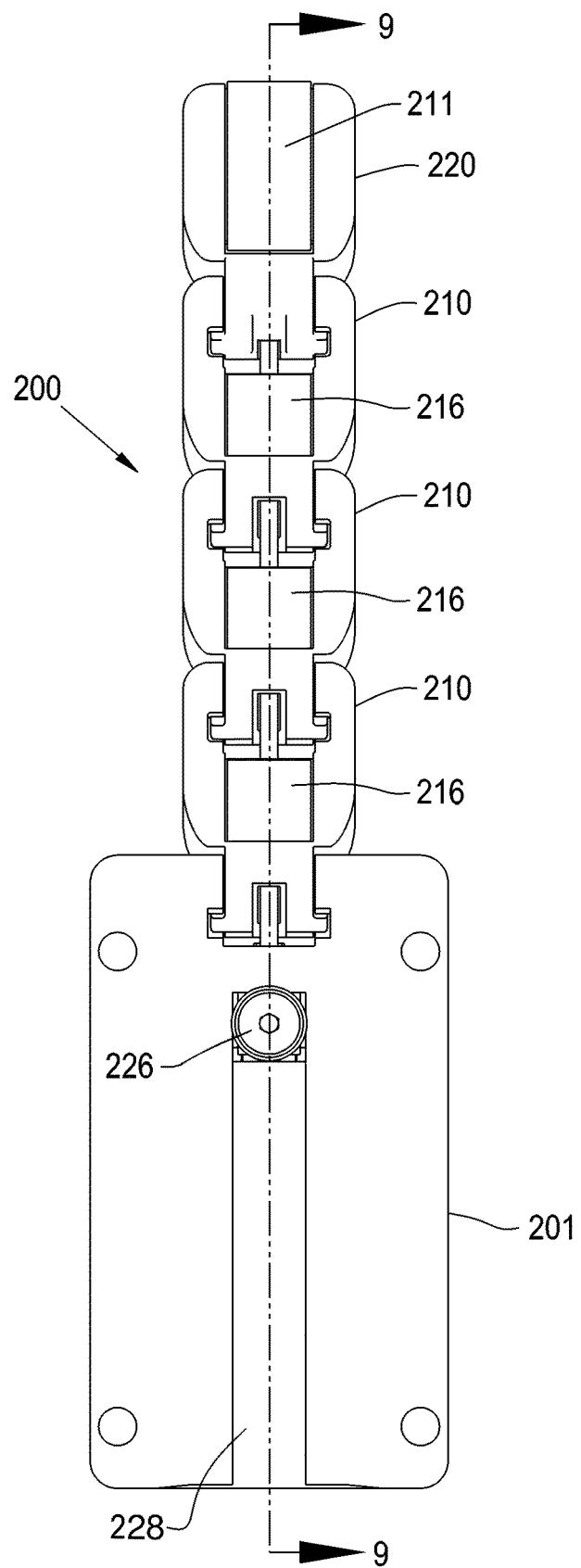
FIG. 8 is a front view of the of the gripper of FIG. 6.
Figure 9:
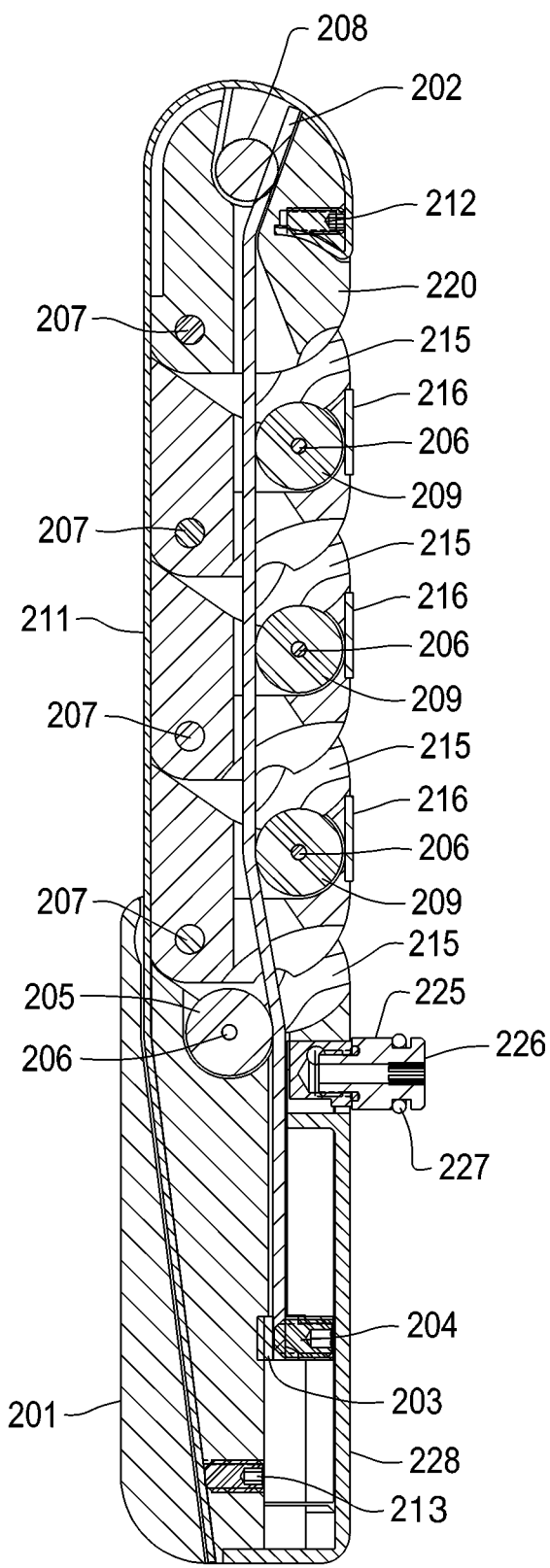
FIG. 9 is a cross-sectional view of the gripper, taken across line 9-9 in FIG. 8.

Bosses 114, protruding from the sides of common segments 110, engage complimentary slots 115, in base 101 and segments 110 to constrain the angle of CCW rotation of the segment pinned to base 101 and each successive pinned segment in the segment chain, relative to the prior segment (FIG. 4). Thusly constrained by the action of bosses 114 within slots 115, the segments cannot rotate CCW about pivots 107 beyond a position in which the segments are in a straight, vertical alignment with one another.

Clockwise (CW) rotation of any segment under the influence of an external torque causes additional stretching of strip 111, with a resulting increase in the torque applied by the strip to the CW rotated segment. In this manner, strip 111 functions as an abducting tendon which constantly applies a torque to segments 110 and 120 about pivot pin 107 to restore the segments into straight vertical alignment with one another. Downward motion of adductor cable 102 through the central passages of segments 110 induces a CW torque in segments 110 and 120 that causes the segments to rotate CW about pivot pins 107, further stretching abductor strip 111.

Pads 116 are suitably bonded into complimentary recesses in segments 110. Pads 116 are constructed of a material such as a suitable elastomer or a nanodiamond impregnated metal substrate, possessing a high coefficient of static friction, so as to enhance the frictional forces generated between the pad and any surface of the gripped workpiece that the pad might contact.

Figure 2:
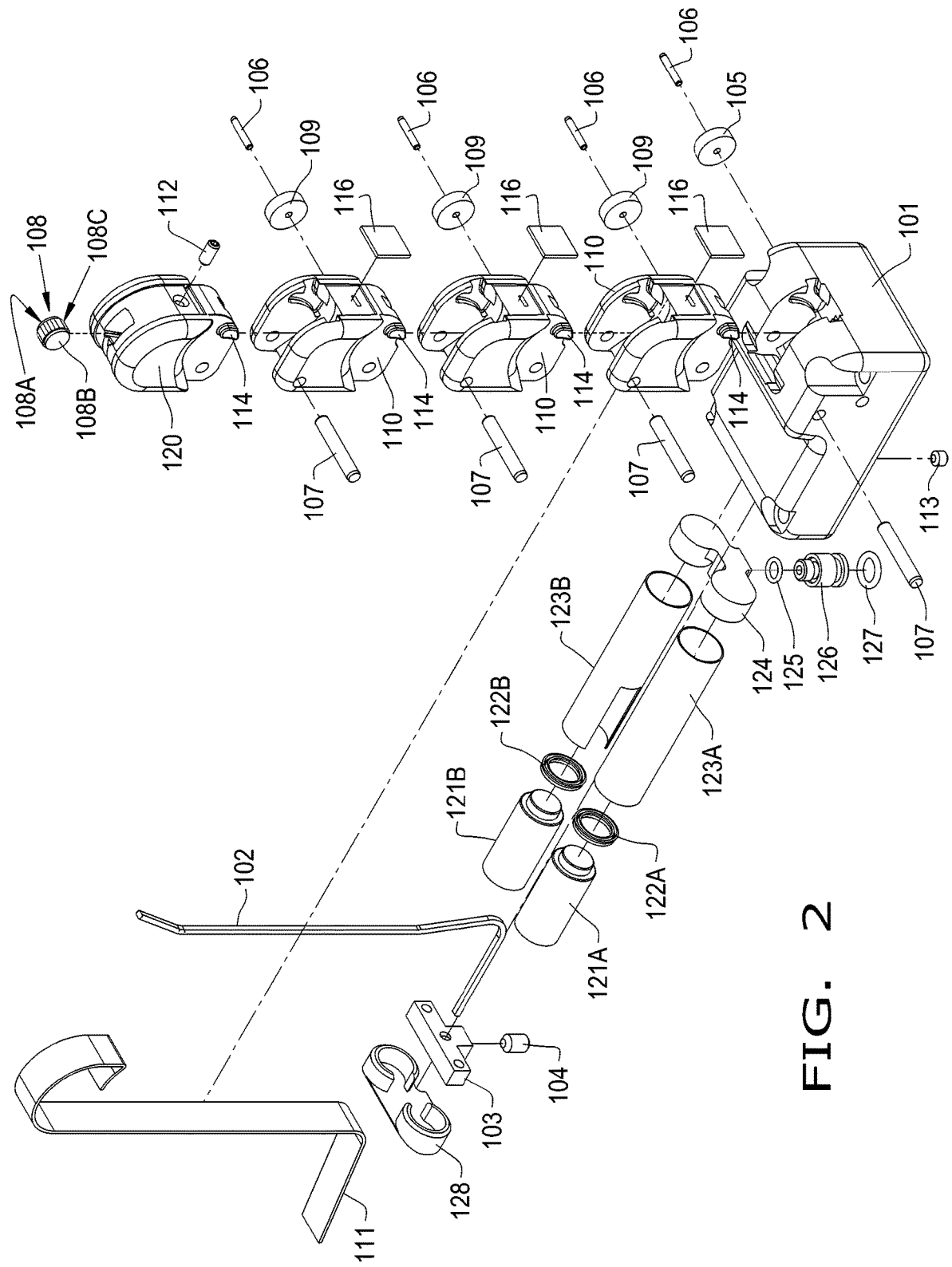
FIG. 2 is an exploded view of the gripper of FIG. 1.
Figure 3:
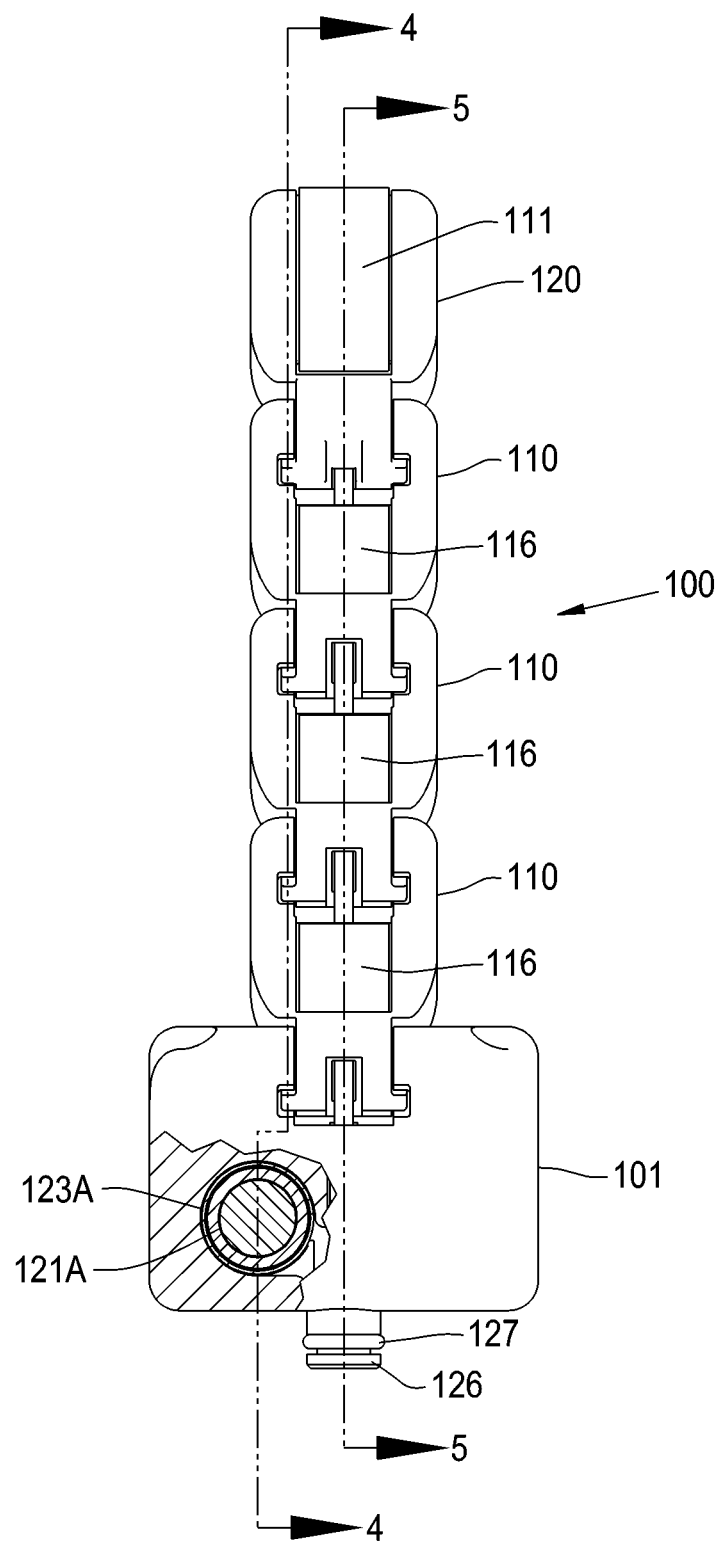
FIG. 3 is a front and partial section view of the gripper of FIG. 1.

The cleat 108 mechanically fastens the distal end of adductor cable 102 to distal segment 120. Cleat 108 is comprised of central cylinder 108C the outer diameter of which receives a straight knurl or other friction enhancing treatment such as a nanodiamond impregnated plating. Bosses 108A and 108B flank central cylinder 108C (FIG. 2).

Figure 5:
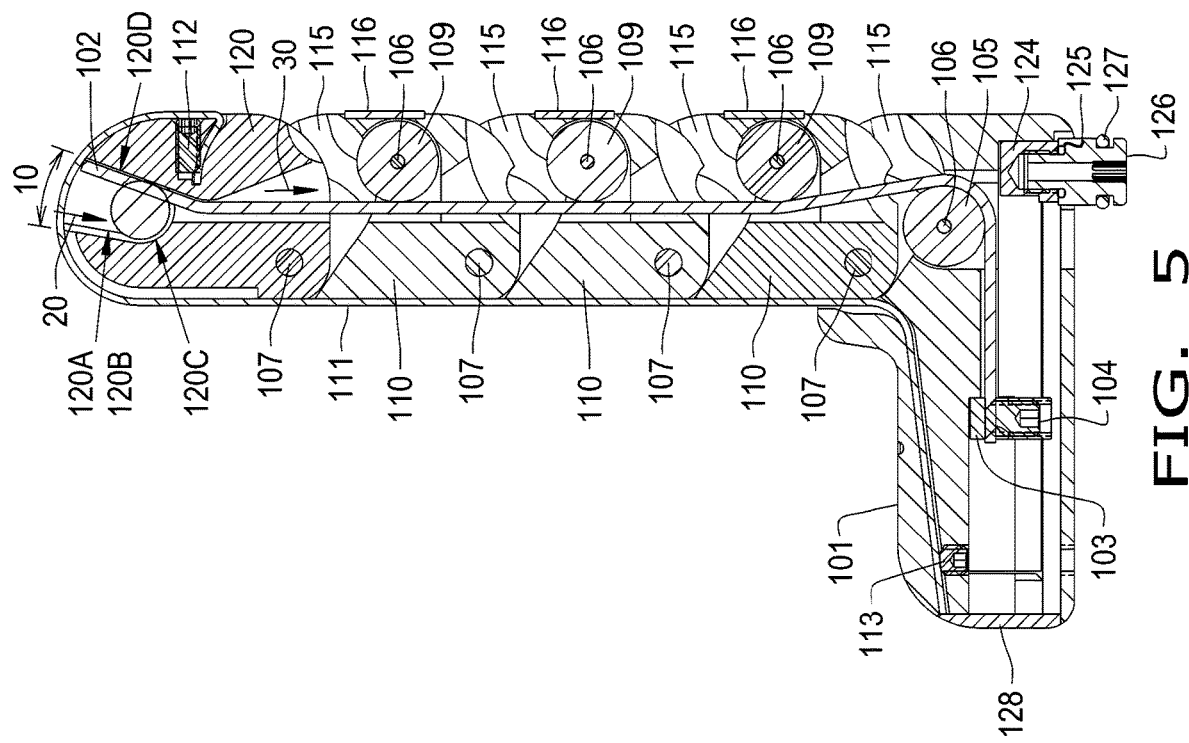
FIG. 5 is a cross-sectional view of the gripper, taken across line 5-5 in FIG. 3.

After installation of the cleat 108 into distal segment 120, the surface of boss 108A rests against complimentary surface 120A in the cleat cavity within segment 120, while the surface of boss 108B similarly rests against complimentary surface 120B. A complimentary relief 120C forms a cleat cavity 120C within segment 120 to prevent any portion of the central cylinder 108C of cleat 108 from contacting any portion of segment 120 (FIGS. 2 and 5). Central cylinder 108C is free to contact the surface of cable 102 which is pressed into contact with surface 120D of segment 120 by the action of central cylinder 108C. Angle 10 denotes the angle formed by surfaces 120A and 120B and cable contact surface 120D in segment 120. Angle 10 is chosen to be shallow, in the range of 10 to 30 degrees. Arrow 20 indicates the force applied to cleat central cylinder 108A to install cleat 108 into cleat cavity 120C of distal segment 120. While cable 102 is held taut, Force 20 is applied to the left of the axis of central cylinder 108C as cleat 108 is guided into the mouth of recess 120C, causing the surface of cylinder 108C to roll CCW against the surface of cable 102 while surfaces 108A and 108B slide against surfaces 120A and 120B, respectively. The acute nature of angle 10 creates a wedging action which decreases the space between surfaces 120A and 120B and 120D as cleat 108 moves progressively into recess 120C. This decrease in space progressively compresses cable 102 between the surface of cleat central cylinder 108C and surface 120D of segment 120 as the cleat 108 rolls along the surface of the cable 102, until the cable 102 becomes completely jammed against surface 120D, stopping the entry of the cleat 108 into recess 120C. Arrow 30 indicates the direction of external tension in cable 102 as the cable is pulled by the action of yoke 103 (FIGS. 2 and 5). Tension applied in the direction of arrow 30 causes cleat 108 to rotate CW, with surfaces 108A and 108B rolling against surfaces 120A and 120B, respectively, which causes further compression of cable 102 against surface 120C by cylinder 108C. In this manner, any external tension applied to cable 102 in the direction of arrow 30 acts to proportionally increase the jamming force applied by cleat 108 against cable 102 to retain cable 102 against surface 120D.

Gripper 100 may include at least one actuator to provide motive force against yoke 103. The at least one actuator may include at least one fluid actuator. The at least one fluid actuator may include at least one piston 121A, 121B disposed and slidable within at least one cylinder 123A. A surface of the yoke 103 may bear against complimentary faces of pistons 121A and 121B. In this regard, the yoke 103 operably connects and attaches the cable 102 to the at least one actuator. Pistons 121A and 121B are contained within complimentary bores within cylinders 123A and 123B, respectively, such that the pistons are free to translate along the longitudinal axes of the cylinders 123A and 123B, but are constrained from radial movement. Elastomeric seals 122A and 122B seal the periphery of pistons 121A and 121B against the interior bores of cylinders 123A and 123B, respectively, to prevent the egress of motive fluid introduced into cylinders 123A and 123B between cap 124 and pistons 121A and 121B, around pistons 121A and 121B, respectively. Cylinders 123A and 123B may be press-fit, welded, soldered or braised, or adhesively bonded onto complimentary bosses provided on cap 124 to prevent the egress of motive fluid between the cylinders and cap. A threaded port in the bottom of the cap 124 accepts a mating fitting 126 to allow one or a plurality of grippers 100 to be mounted onto a manifold 40 (FIG. 11) which shares a common fluid passage 50 with all grippers. O-ring 127 prevents the egress of motive fluid between the fitting 126 and the complimentary manifold fluid passage 50. The periphery of fitting 126 may similarly be sealed against a complimentary face of cap 124 with O-ring 125. Plug 128, closes off the open ends of cylinders 123A and 123B to prevent the ingress of contaminants into the cylinders.

Referring now to FIGS. 6-10, there is shown another embodiment of a gripper 200. In an analogous manner to the embodiment of gripper 100, gripper 200 consists of base 201 to which is attached a chain of multiple identical articulated segments 210, capped by an articulated distal segment 220. Gripper 200 may include an adducting tendon 202 having a proximal end connected to yoke 203 and a distal end connected to the distal segment 220. The adducting tendon 202 may be in the form of a cable 202. A setscrew 204 may mechanically fasten the proximal end of the cable 202 to the yoke 203. However, in addition or alternatively to such mechanical attachment, the cable 202 may be attached with a suitable adhesive applied between the cable 202 and the yoke 203. The cable 202 may be composed of any desired material. In one embodiment, the cable 202 is a polymer cable which offers the advantages over traditional steel cable of improved resistance to fatigue and corrosion, greater flexibility, improved dissipation of mechanical shock, and lower cost.

A pulley 205, supported by pivot pin 206 pressed into complimentary holes in base 201, routes the motion of cable 202 so that as the proximal end of the cable 202 is pulled by the motion of yoke 203 relative to base 201, cable 202 is drawn through the central passages of articulated segments 210. Although pulley 205 is shown as being directly supported by pivot pin 206, it is understood that a suitable commercial bearing bushing, radial ball bearing, or needle bearing could be interposed between the pulley and pin when the size of pulley 205 is sufficiently large to allow doing so.

Pivot pins 207 pass though complimentary holes in base 201 and segments 210 and 220 to attach common segments 210 to base 201, to each other, and to distal segment 220, forming a chain of pinned articulated segments radiating outwards from base 201. Although segments 210 and segment 220 are shown as being directly supported by pivot pins 207, it is understood that a suitable commercial bearing bushing, radial ball bearing, or needle bearing could be interposed between the pivot hole in the segments and pin 207 when the size of segment is sufficiently large to allow doing so.

The upper, distal end of the cable 202 may be mechanically fastened to the distal segment 220 with an upper knurled cylindrical cleat 208. It should be appreciated that the cable 202 and the segment 220 may be additionally or alternatively mechanically attached to one another by a suitable adhesive applied between the cable 202 and the segment 220 and/or suitable setscrew configured to reside within the segment 220 to apply a clamping force against the cable 202. Cable 202 passes over pulleys 209 disposed within each identical segment 210. In this manner, cable 202, suitably attached between yoke 203 and distal segment 220, effectively forms the taut adducting tendon 202 located on one side of segment pivot pins 207. Although pulleys 209 are shown as being directly supported by pivot pins 206 pressed into complimentary holes in segments 210, it is understood that a suitable commercial bearing bushing, radial ball bearing, or needle bearing could be interposed between the pulley and pin when the size of pulley 209 is sufficiently large to allow doing so.

Gripper 200 may include an abducting tendon 211. An external strip 211 may effectively form the abducting tendon 211, which is located on the opposing side of pivot pins 207. The external strip 211 may be composed of a suitable elastomeric material. The distal end of the strip 211 is attached with setscrew 212 or in any desired way, such as thermal or adhesive bonding, into a complimentary groove in distal segment 220. The proximal end of elastomeric strip 211 is disposed within a complementary slot in base 201 and is attached to base 201 by the clamping action of setscrew 213 or by other suitable thermal or adhesive bonding. The portion of strip 211 between the distal and proximal attached ends is unconstrained and free to stretch or relax. The strip 211 is stretched during installation to create a tension in the strip 211 which acts to pull distal segment 220 toward base 201. This pull induces a torque in distal segment 220 and common segments 210 which acts to rotate each segment counterclockwise (CCW) with respect to pivot pins 207. It should be understood by one skilled in the art that strip 211 could be replaced by one or more helical extension springs or a flexible, but non-stretchable tensile member attached to a suitable spring to provide the same function as an elastomeric strip.

Bosses 214, protruding from the sides of common segments 210, engage complimentary slots 215, in base 201 and segments 210 to constrain the angle of CCW rotation of the segment pinned to base 201 and each successive pinned segment in the segment chain, relative to the prior segment (FIG. 4). Thusly constrained by the action of bosses 214 within slots 215, the segments cannot rotate CCW about pivots 207 beyond a position in which the segments are in a straight, vertical alignment with one another.

Clockwise (CW) rotation of any segment under the influence of an external torque causes additional stretching of strip 211, with a resulting increase in the torque applied by the strip to the CW rotated segment. In this manner, strip 211 functions as an abducting tendon which constantly applies a torque to segments 210 and 220 about pivot pin 207 to restore the segments into straight vertical alignment with one another. Downward motion of adductor cable 202 through the central passages of segments 210 induces a CW torque in segments 210 and 220 that causes the segments to rotate CW about pivot pins 207, further stretching abductor strip 211.

Pads 216 are suitably bonded into complimentary recesses in segments 210. Pads 216 are constructed of a material such as a suitable elastomer or a nanodiamond impregnated metal substrate, possessing a high coefficient of static friction, so as to enhance the frictional forces generated between the pad and any surface of the gripped workpiece that the pad might contact.

The cleat 208 mechanically fastens the distal end of adductor cable 202 to distal segment 220 in an identical manner as cleat 108 mechanically fastens the distal end of adductor cable 102 to distal segment 120.

Gripper 200 may include at least one actuator to provide motive force against yoke 203. The at least one actuator may include at least one fluid actuator. The at least one fluid actuator may include at least one piston 221A, 221B disposed and slidable within at least one cylinder 223A. A surface of the yoke 203 may bear against complimentary faces of pistons 212A and 212B. In this regard, the yoke 203 operably connects and attaches the cable 202 to the at least one actuator. Pistons 221A and 221B are contained within complimentary bores within cylinders 223A and 223B, respectively, such that the pistons are free to translate along the longitudinal axes of the cylinders 223A and 223B, but are constrained from radial movement. Elastomeric seals 222A and 222B seal the periphery of pistons 221A and 221B against the interior bores of cylinders 223A and 223B, respectively, to prevent the egress of motive fluid introduced into cylinders 223A and 223B between cap 224 and pistons 221A and 221B, around pistons 221A and 221B, respectively. Cylinders 223A and 224B may be press-fit, welded, soldered or braised, or adhesively bonded onto complimentary bosses provided on cap 224 to prevent the egress of motive fluid between the cylinders and cap. A threaded port in the bottom of the cap 224 accepts a mating fitting 226 to allow one or a plurality of grippers 200 to be mounted onto a manifold (not shown) which shares a common fluid passage with all grippers. O-ring 227 prevents the egress of motive fluid between the fitting 226 and the complimentary manifold fluid passage (not shown). The periphery of fitting 226 may similarly be sealed against a complimentary face of cap 224 with O-ring 225. Plug 228, closes off the open ends of cylinders 223A and 223B to prevent the ingress of contaminants into the cylinders.

Figure 10:
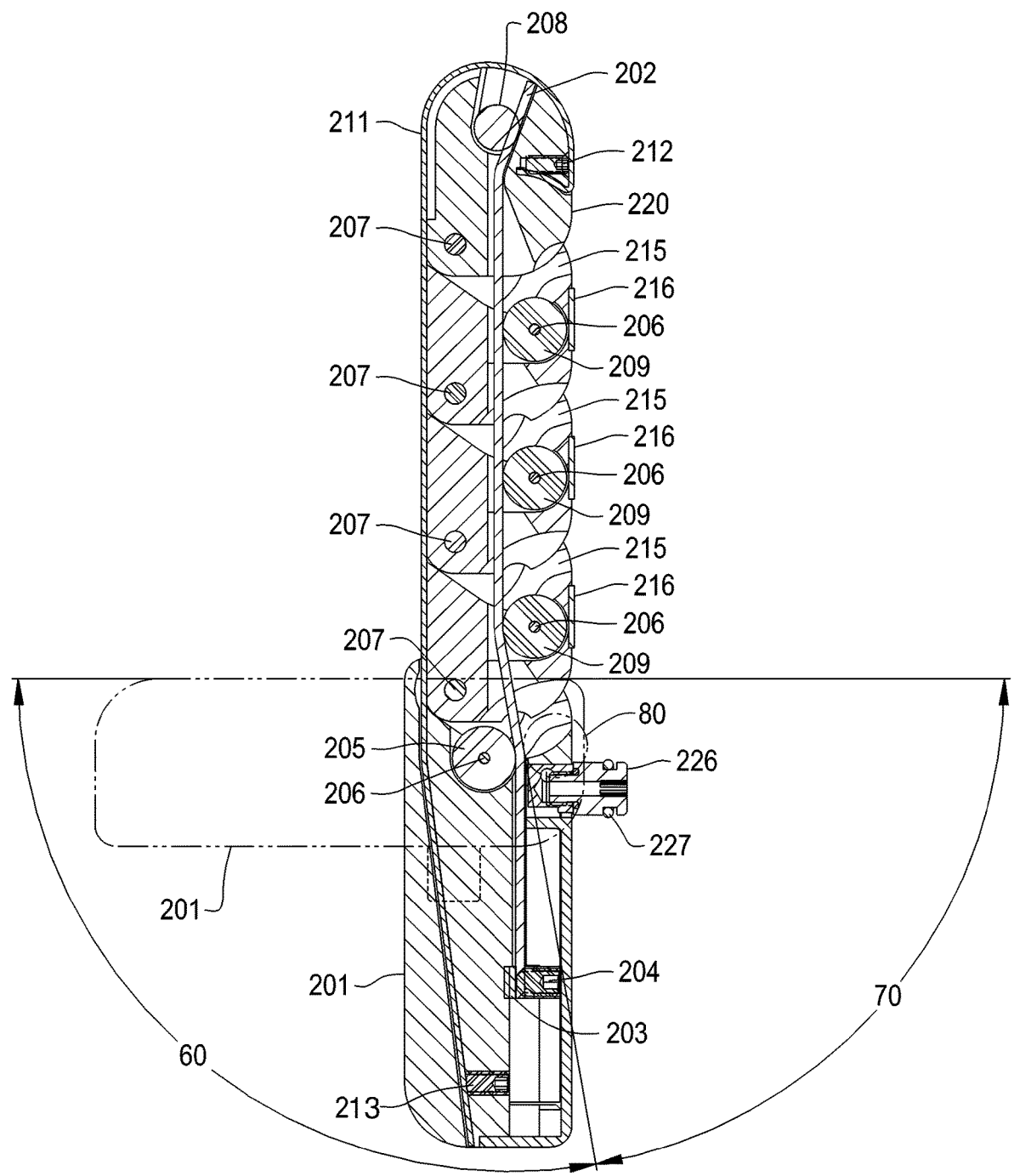
FIG. 10 is a cross-sectional view of the gripper, taken across line 9-9 in FIG. 8, illustrating possible orientations of the cylinders and pistons.

Referring now to FIG. 10, it should be understood by one skilled in the art that the flexible nature of cable 202 allows the cable to be wrapped to varying degrees about the circumference of pully 205. It is understood that although the current embodiment comprises cylinders and slidable pistons orientated parallel to the longitudinal axis of the finger segments, the cylinders and pistons can be oriented selectively at any angle within the range of angle 60. It should also be understood by one skilled in the art that if pully 205 is replaced by a pully 80, the cylinders and pistons can be oriented selectively at any angle within the range of angle 70.

Figure 11:
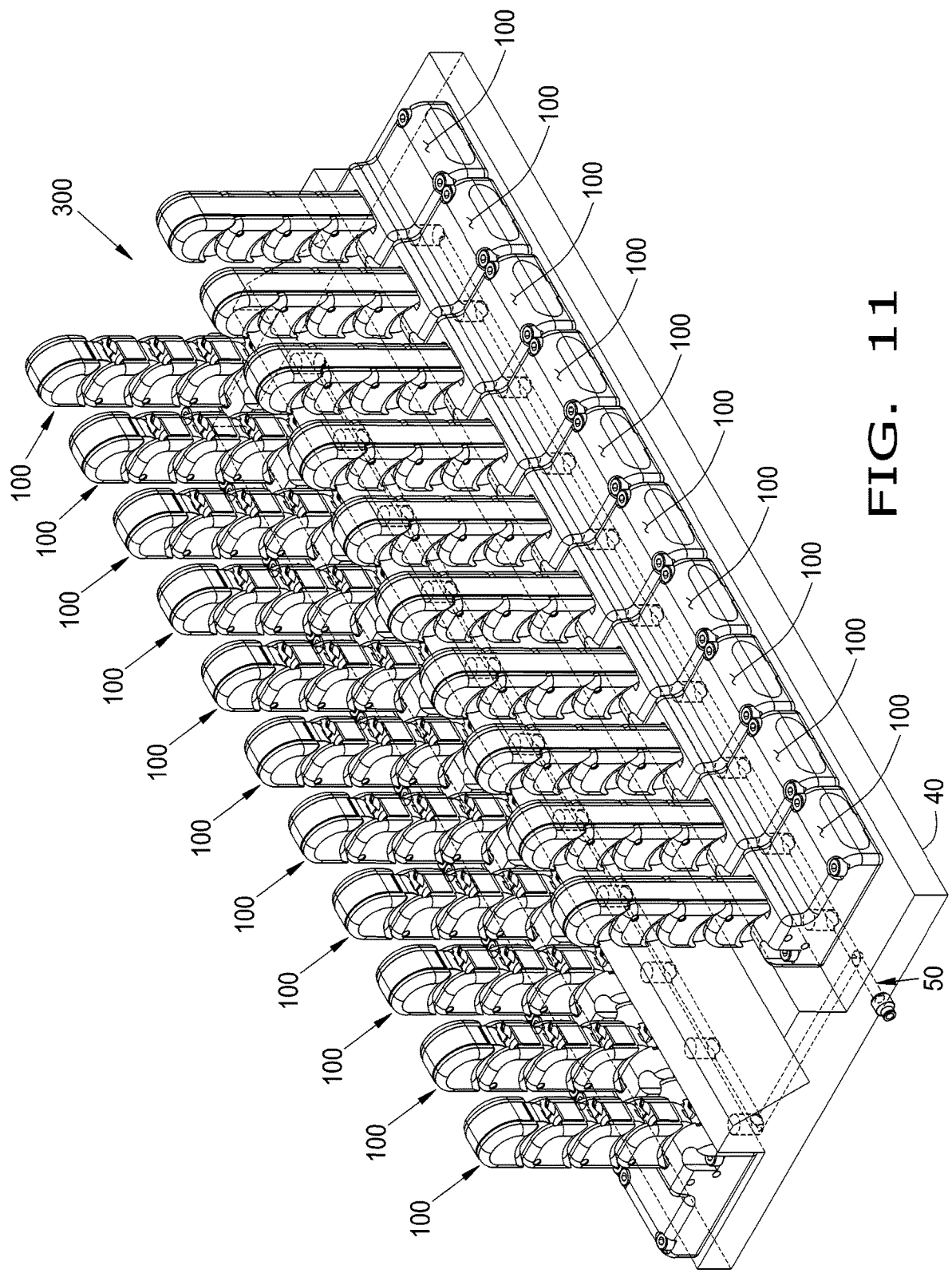
FIG. 11 is a perspective view of an embodiment of an array of manifold mounted gripper modules.

Referring now to FIG. 11, there is shown a gripper array 300 of manifold mounted gripper modules. The gripper array 300 may include multiple grippers 100 and/or grippers 200, as discussed above. As shown, the gripper array 300 includes multiple juxtaposed grippers 100. The gripper array 300 may also include a manifold 40 and at least one fluid passage 50. The manifold 40 may mount at least two grippers 100, 200 via the mating fitting 126, 226 and corresponding cap 124, 224. The at least one fluid passage 50 may fluidly connect the grippers 100, 200 which are mounted on the manifold 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gripper for gripping a workpiece, comprising:
a base;
at least one middle segment pivotally connected to the base;
a distal segment pivotally connected to the at least one middle segment;
at least one actuator disposed within the base;
an adducting tendon having a proximal end attached to the at least one actuator and a distal end attached to the distal segment, the at least one actuator being configured for linearly and nonrotationally moving the proximal end of the adducting tendon; and
an abducting tendon having a proximal end attached to the base and a distal end attached to the distal segment,
wherein the at least one middle segment and the distal segment are configured for gripping the workpiece as the at least one actuator moves in a first direction and ungripping the workpiece as the at least one actuator moves in a second direction which is opposite to the first direction.

2. The gripper of claim 1, further including a yoke located within the base and connected to the at least one actuator, the yoke attaching the proximal end of the adducting tendon to the at least one actuator.

3. The gripper of claim 1, wherein the at least one middle segment defines a first longitudinal axis, wherein the at least actuator defines a second longitudinal axis which is angled relative to the first longitudinal axis of the at least one middle segment.

4. The gripper of claim 1, wherein the at least one actuator is in the form of at least one fluid powered linear actuator.

5. The gripper of claim 4, wherein the at least one fluid powered linear actuator includes at least one cylinder and at least one piston slideably disposed within the at least one cylinder.

6. The gripper of claim 5, wherein the at least one fluid powered linear actuator includes two cylinders and two pistons respectively disposed within the cylinders.

7. The gripper of claim 1, wherein the adducting tendon is internally disposed within the base, the at least one middle segment, and the distal segment.

8. The gripper of claim 7, further including a plurality of pulleys internally disposed within the base and the at least one middle segment, and each pulley of the plurality of pulleys is configured for contacting the adducting tendon.

9. A gripper array for gripping a workpiece, comprising:
a manifold; and
a plurality of grippers mounted on the manifold, each gripper of the plurality of grippers including:
a base;
at least one middle segment pivotally connected to the base;
a distal segment pivotally connected to the at least one middle segment;
at least one actuator disposed within the base;
an adducting tendon having a proximal end attached to the at least one actuator and a distal end attached to the distal segment, the at least one actuator of each gripper of the plurality of grippers being configured for linearly and nonrotationally moving the proximal end of the adducting tendon; and
an abducting tendon having a proximal end attached to the base and a distal end attached to the distal segment,
wherein the at least one middle segment and the distal segment of each gripper of the plurality of grippers are configured for gripping the workpiece as the at least one actuator moves in a first direction and ungripping the workpiece as the at least one actuator moves in a second direction which is opposite to the first direction.

10. The gripper array of claim 9, wherein each gripper of the plurality of grippers further includes a yoke located within the base and connected to the at least one actuator, the yoke attaching the proximal end of the adducting tendon to the at least one actuator.

11. The gripper array of claim 9, wherein the at least one middle segment of each gripper of the plurality of grippers defines a first longitudinal axis, wherein the at least actuator of each gripper of the plurality of grippers defines a second longitudinal axis which is angled relative to the first longitudinal axis of the at least one middle segment.

12. The gripper array of claim 9, wherein the at least one actuator of each gripper of the plurality of grippers is in the form of at least one fluid powered linear actuator.

13. The gripper array of claim 12, wherein the at least one fluid powered linear actuator of each gripper of the plurality of grippers includes at least one cylinder and at least one piston slideably disposed within the at least one cylinder.

14. A method for gripping a workpiece, comprising the steps of:
providing a gripper including a base, at least one middle segment pivotally connected to the base, a distal segment pivotally connected to the at least one middle segment, at least one actuator disposed within the base, an adducting tendon having a proximal end attached to the at least one actuator and a distal end attached to the distal segment, the at least one actuator being configured for linearly and nonrotationally moving the proximal end of the adducting tendon, and an abducting tendon having a proximal end attached to the base and a distal end attached to the distal segment;
gripping the workpiece, by the at least one middle segment and the distal segment, upon moving the at least one actuator in a first direction; and
ungripping the workpiece, by the at least one middle segment and the distal segment, upon moving the at least one actuator in a second direction which is opposite to the first direction.

15. The method of claim 14, wherein the at least one actuator linearly moves the proximal end of the adducting tendon for gripping and ungripping the workpiece.

16. The method of claim 14, wherein the gripper further includes a yoke located within the base and connected to the at least one actuator, the yoke attaching the proximal end of the adducting tendon to the at least one actuator.

\* \* \* \* \*